(12) United States Patent
Schlemmer (10) Patent No.: US 8,181,986 B2
(45) Date of Patent: May 22, 2012

(54) DIRECTIONAL DEVICE FOR DEPLOYMENT OF AN AIRBAG

(75) Inventor: Christian Schlemmer, Landshut (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 346 days.

(21) Appl. No.: 12/012,227

(22) Filed: Jan. 31, 2008

(65) Prior Publication Data

US 2008/0203709 A1   Aug. 28, 2008

(30) Foreign Application Priority Data

Feb. 6, 2007   (DE) .......................... 10 2007 005 922

(51) Int. Cl.
*B60R 21/205* (2011.01)
*B60R 21/215* (2011.01)

(52) U.S. Cl. ..................................... 280/728.3; 280/732

(58) Field of Classification Search .............. 280/728.3, 280/732, 743.1, 743.2
See application file for complete search history.

(56) References Cited

U.S. PATENT DOCUMENTS

| | | | | |
|---|---|---|---|---|
| 3,778,085 A * | 12/1973 | Lipkin | ........................... | 280/734 |
| 4,759,568 A * | 7/1988 | Paefgen et al. | ............... | 280/732 |
| 4,893,833 A * | 1/1990 | DiSalvo et al. | ............... | 280/732 |
| 5,035,444 A * | 7/1991 | Carter | ........................... | 280/732 |
| 5,238,264 A * | 8/1993 | Barnes | ........................ | 280/732 |
| 5,292,151 A * | 3/1994 | Parker | ........................ | 280/728.3 |
| 5,306,042 A | 4/1994 | Frank | | |
| 5,320,381 A * | 6/1994 | Barnes et al. | ............. | 280/728.3 |
| 5,360,231 A * | 11/1994 | Adams | ........................ | 280/728.2 |
| 5,398,959 A * | 3/1995 | Avila | ........................ | 280/728.3 |
| 5,427,408 A * | 6/1995 | Ando et al. | ................. | 280/728.3 |
| 5,433,474 A * | 7/1995 | Farrington et al. | ........ | 280/728.3 |
| 5,452,913 A * | 9/1995 | Hansen et al. | ............. | 280/728.1 |
| 5,460,403 A * | 10/1995 | Hansen et al. | ................ | 280/732 |
| 5,536,037 A * | 7/1996 | Cherry | ........................ | 280/728.3 |
| 5,613,701 A * | 3/1997 | Bentley et al. | ............. | 280/728.3 |
| 5,630,614 A * | 5/1997 | Conlee et al. | ............. | 280/730.1 |
| 5,806,880 A * | 9/1998 | Gray | ........................ | 280/728.3 |
| 5,901,976 A * | 5/1999 | Kreuzer et al. | ............. | 280/728.3 |
| 5,941,558 A * | 8/1999 | Labrie et al. | ............... | 280/728.3 |
| 5,971,431 A | 10/1999 | Wohllebe et al. | | |
| 5,975,563 A * | 11/1999 | Gallagher et al. | ......... | 280/728.3 |
| 6,089,642 A * | 7/2000 | Davis et al. | ..................... | 296/70 |
| 6,149,187 A * | 11/2000 | Single et al. | ............... | 280/728.3 |
| 6,158,763 A * | 12/2000 | Dominique et al. | ....... | 280/728.2 |
| 6,378,894 B1 * | 4/2002 | Trevino et al. | ............. | 280/728.3 |
| 6,460,880 B1 * | 10/2002 | Gallagher et al. | ........... | 280/732 |
| 6,626,455 B2 * | 9/2003 | Webber et al. | ............. | 280/728.2 |

(Continued)

FOREIGN PATENT DOCUMENTS

| | | |
|---|---|---|
| DE | 2122704 | 5/1971 |
| DE | 3843686 A1 * | 6/1990 |

(Continued)

*Primary Examiner* — Faye M Fleming
*Assistant Examiner* — Laura Freedman
(74) *Attorney, Agent, or Firm* — Wolf, Greenfield & Sacks, P.C.

(57) ABSTRACT

A directional device for the deployment of an airbag includes a deflection element that directs airbag deployment, the deflection element on actuation of the airbag exerting a pressure on the airbag which is directed away from the windscreen during the entire airbag deployment phase such that the airbag is directed away from the windscreen on its deployment. The directional device prevents damage/destruction of the windscreen on actuation of the airbag and thus improves protection of the vehicle occupants. The directional device is also capable of being variable fixed and replaceable in an airbag configuration/covering and may also optionally be integrated therein such that simplification of the development or series production of the airbag configuration is achieved.

14 Claims, 7 Drawing Sheets

U.S. PATENT DOCUMENTS

| | | | |
|---|---|---|---|
| 7,226,079 B2 * | 6/2007 | Hier et al. | 280/743.2 |
| 7,293,795 B2 * | 11/2007 | Kong | 280/732 |
| 7,354,061 B2 * | 4/2008 | Yasuda et al. | 280/728.3 |
| 7,429,058 B2 * | 9/2008 | Chen et al. | 280/728.3 |
| 2002/0135161 A1 * | 9/2002 | Lamb et al. | 280/728.3 |
| 2006/0033313 A1 * | 2/2006 | Horiyama | 280/728.3 |
| 2008/0007032 A1 * | 1/2008 | Sadek et al. | 280/728.3 |

FOREIGN PATENT DOCUMENTS

| | | |
|---|---|---|
| DE | 19846853 A1 | 4/2000 |
| DE | 10307964 A1 | 6/2004 |
| DE | 10306385 A1 | 11/2004 |
| DE | 10316272 A1 | 11/2004 |
| DE | 10358896 A1 | 7/2005 |
| DE | 102005043705 A1 | 2/2006 |
| EP | 0929419 B1 | 9/1997 |
| GB | 1318687 | 5/1973 |
| GB | 2386877 A | 10/2003 |
| JP | 05050893 A * | 3/1993 |
| JP | 05270346 A * | 10/1993 |

* cited by examiner

DIRECTIONAL DEVICE FOR DEPLOYMENT OF AN AIRBAG

The present invention relates to a directional device for the deployment of an airbag, in particular to a directional device for passenger front airbags.

PRIOR ART

Airbags used nowadays in motor vehicles deploy with a high build-up of pressure and at very high speed, and in the process escape, after actuation, through their airbag covering which comprises one or a plurality of lids. Deployment of the airbag is dictated amongst other things by the mass of the airbag hatch, the explosion force and folding of the airbag module in addition to the actual opening contact force, whereby the latter is the deployment force acting outside the airbag covering and is essentially determined by the type of weakening introduced into the airbag covering and the stiffness of the airbag lid's hinge.

Particularly on the passenger side, the airbag is disposed such that the airbag covering lies with its lids on the upper side of the instrument panel facing towards the windscreen so that there is a danger that on actuation the rapidly expanding airbag will press against the windscreen and will destroy it or push it out of the windshield sealing frame. High-speed photos have also shown that where the windscreen remains intact, the instrument panel is exposed to high stresses due to expansion of the airbag between it and the screen and may move dramatically downwards. Both situations constitute high risks for the occupants.

Particularly in the case of strongly raked windscreens, this problem is even more accentuated particularly since at one manufacturer's the same instrument panel (and thus the same airbag module with covering) is frequently used cross-project in models with, where appropriate, very differently raked windscreens. Thus project-optimized development of the airbag module is not possible.

One approach to reducing the danger which emanates from the airbag touching the windscreen consisted of using sacrificial layers such as textile strips with a predetermined rupture line in airbag modules which although they reduce pressure of the airbag against the screen cannot, however, prevent it.

Solutions are also known in the prior art which guide deployment of the airbag by the shape of the firing channel or, by means of sensors, influence the opening geometry of the airbag lids depending on the occupant's position. The latter solution is disclosed, for example, in EP 0 929 419 B1. Likewise, solutions are known in which the airbag lids themselves are supposed to be prevented from hitting the windscreen whereby DE 103 58 896 A1 achieves this by way of a limiting strip on the underside of the airbag covering. DE 103 07 964 A1, on the other hand, in addition to a firing channel discloses a joining strap of the airbag lid which on actuation of the airbag is supposed to prevent the abruptly opening lids from being able to injure the passengers.

PRESENTATION OF THE INVENTION

The object of the invention is, therefore, to develop a directional device which deflects an airbag away from the windscreen during its deployment such that the above-mentioned problems and dangers, which arise on airbag deployment, in airbags to date, are prevented.

This object is achieved with a directional device for the deployment of an airbag having the features of claim 1. Further advantageous embodiments emerge from the subclaims.

The directional device according to the invention for the deployment of an airbag comprises a flexible deflection element that directs airbag deployment, said element on actuation of the airbag exerting a targeted pressure there upon and influencing the direction during the entire airbag deployment phase. In this manner the airbag is directed away from the windscreen during its deployment, damage or destruction of the windscreen on actuation of the airbag is prevented and thus protection of the vehicle occupants is substantially improved. Due to the flexibility of the deflection element, the pressure (force) necessary to direct the airbag away from the windscreen is adjusted optimally in respect of the actual opening contact force and the predetermined direction of the airbag's deployment. As already mentioned, the actual opening contact force depends on a plurality of factors such as the explosion force and the weakening introduced into the airbag lid. Consequently, if both airbag module-dependent and vehicle model-dependent changes arise in the actual opening contact force then, due to this design of the deflection element, protection of the occupants is ensured at any rate whilst the least possible stress is exerted on the airbag by the pressure of the deflection element.

A deflection element is preferred which is pivotable about a rigid hinge such that its orientation on actuation becomes predeterminable by means of appropriate or chosen rigidity.

The deflection element is advantageously pivotable on actuation of the airbag into no more than one position in which the deflection element is essentially parallel to the windscreen. In this manner, even with high actual opening contact forces it will be ensured at all times that no dangerous contact can occur between airbag and windscreen although with lower actual opening contact forces of the airbag less pivoting is enabled with correspondingly less stress on the airbag due to the pressure of the deflection element.

In a preferred embodiment, the directional device has an essentially L-shaped cross-section, the long section of which forms the deflection element and the short section of which is an attachment section. By means of this embodiment, the directional device can be used flexibly in a large number of airbag configurations whereby the L-shaped form makes it possible to choose the attachment direction of the directional device to be perpendicular to the pressure applied as a result of the expanding airbag.

With regard to effective deflection of the expanding airbag, it is advantageous if in this connection a fin projects from the attachment section of the directional device. In this way, even before reaching the deflection element the fin exerts a deflecting pressure on the surface of the airbag such that a first change of direction of the airbag takes place at an early stage and contact of the airbag with the windscreen is reliably prevented.

The deflection element's directing function is preferably predetermined by the directional device's partial flexibility. The combination of rigidity and flexibility thus ensures both the necessary deflection of the airbag and correct attachment of the directional device and also the smallest possible stress on the airbag surface.

In an advantageous embodiment, the deflection element has a stiffening rib. This provides the necessary rigidity in a structurally simple manner.

The directional device is preferably capable of being fixed to the instrument panel substrate, to an airbag firing channel formed beneath the instrument panel substrate or to an airbag module containing the folded airbag or of being integrated therein whereby the deflection element exerts a pressure away from the windscreen. In this way the directional device may be used with different vehicle models and airbag configurations, as a result of which it is possible to simplify the development of the model-specific instrument panels as well as render the cost-dependent and assembly site-dependent factors more economically viable.

It is particularly preferable for the directional device to have an attachment that can be converted from detachable to non-detachable. This will simplify the transition from development stage to series production and make it less expensive as the same directional device can be used in both stages.

Preferably, the directional device is made from one or a plurality of material components or from a composite material including one or a plurality thereof whereby the material components are selected from the group of thermosetting materials and/or thermoplastics. These materials make it possible to meet the rigidity/flexibility criteria necessary for the directional device in an optimum manner.

In this case, the material component(s) preferably include(s) a filling material such as fiberglass and/or inserts such as knitted fabrics, non-woven systems, oscillatable metal and/or glass mats. These filling materials or inserts are particularly suitable in respect of the rigidity required.

Advantageously, the directional device includes a rigid layer and a gliding layer. The gliding layer serves to come into contact with the expanding airbag whilst not damaging it in the process whereas the rigid layer caters for the necessary directing function and stability of the directional device.

BRIEF DESCRIPTION OF THE DRAWINGS

The invention will be described in the following on the basis of exemplary embodiments which are illustrated with the help of the associated drawings in which.

WAYS OF CARRYING OUT THE INVENTION

Figure 1:
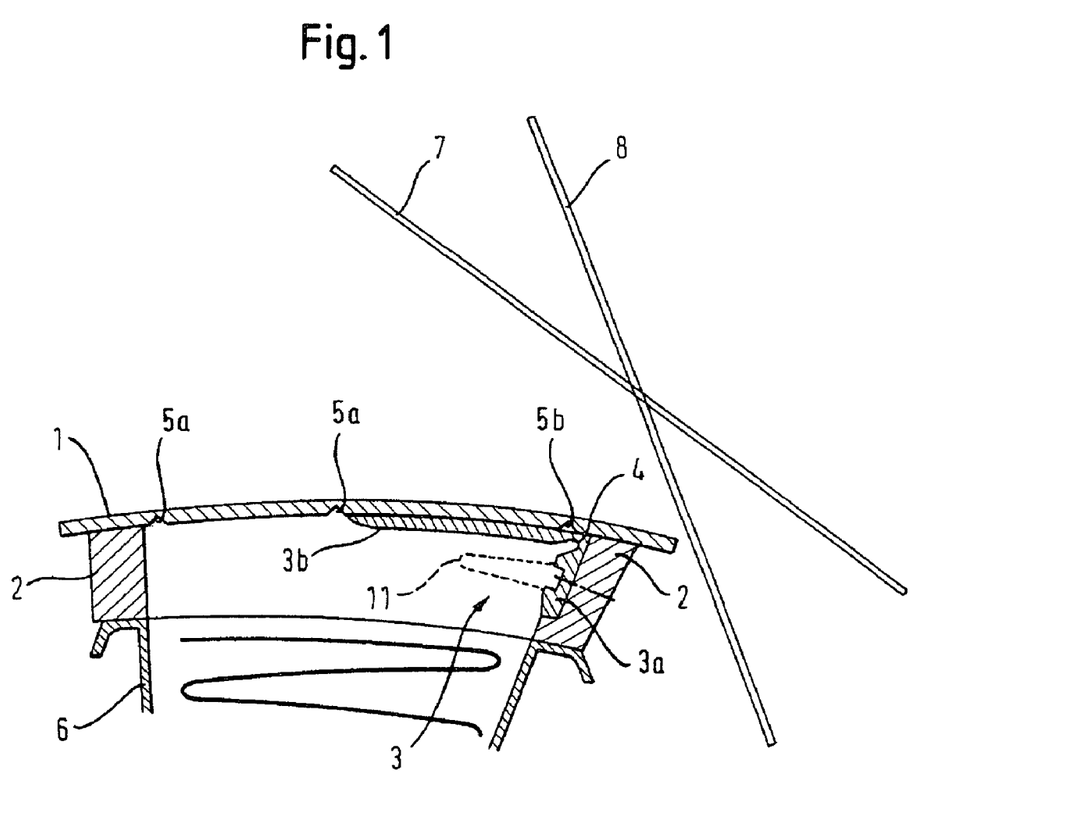
FIG. 1 is a schematic sectional view of a first embodiment of the invention.

FIG. 1 shows a first embodiment of the directional device according to the invention for the deployment of an airbag, said embodiment being installed in an airbag configuration of a passenger airbag. The airbag configuration comprises an inherently stable instrument panel substrate 1 on the underside of which is disposed an airbag firing channel 2. Underneath firing channel 2 is attached an airbag module 6 which contains a folded airbag. Inherently stable substrate 1 is provided with weakenings 5a, 5b, which divide substrate 1 (in this example) into two airbag lids, said weakenings being ruptured on actuation of the airbag by the explosion pressure of the unfolding airbag such that the lids open and allow the airbag to escape from the instrument panel. In addition, the embodiment shape of an airbag lid (not shown) with only one weakening, e.g. rupture or hinge line 5b, is also possible. Moreover, windscreen 7, 8 is indicated above instrument panel 1 with two different rakes of the screen.

Directional device 3 of this embodiment is formed in an L-shape and its attachment section 3a corresponding to the short section of the L is attached with the help of a fastening, e.g. a threaded connection substantially parallel to inherently stable substrate 1, indicated by the dotted line on one side of firing channel 2. Although not explicitly shown here, this fastening may represent both a detachable, temporary fastening (e.g. by means of an appropriate pin system) and also a permanent attachment. Attachment section 3a of directional device 3 may also be designed integrally with firing channel 2. On the underside of inherently stable substrate 1 is located flexible deflection element 3b of directional device 3, which is pivotably joined to attachment section 3a by way of a rigid hinge 4 formed by a weakening of the material thickness of directional device 3, and which extends up to the weakening of inherently stable substrate 1, whereby the length X of directional device 3 and also the spacing of the airbag weakening may be varied. Deflection element 3b, hinge 4 and the attachment section are formed integrally or in one piece. Deflection element 3b may further be provided with a gliding layer facing towards the airbag in order not to damage the airbag on contact with said deflection element. In addition, deflection element 3b may be joined to inherently stable substrate 1 fixedly, movably in relation to each other or not at all (not shown).

On expansion (deployment) of the airbag, the surface of the airbag comes into contact with deflection element 3b and inherently stable substrate 1 and exerts pressure on it. As explained, substrate 1 is ruptured at its weakenings 5a, 5b and springs away upwards as long as deflection element 3b is detachably joined (not shown) to substrate 1. If inherently stable substrate 1 is joined to the deflection element fixedly or movably in relation thereto (not shown) then the substrate element swings up on deployment of the airbag (not shown) and thus exerts a constant force on the airbag to be deployed (not shown). Flexible deflection element 3b, on the other hand, bends and pivots upwards whereby the pivoting movement is limited by rigid hinge 4 and the material properties of deflection element 3b on reaching a pivoted position in which the deflection element lies approximately parallel to windscreen 7, 8. As a result, deployment of the airbag is deflected such that the side of the airbag facing towards the windscreen cannot exert any undue pressure on it and thus cannot damage it or push it out of its mount.

At the same time, a spreading force generated by the expanding airbag on instrument panel 1 is also limited in a downward direction.

Optionally, a fin 11 projecting out of attachment section 3a of directional device 3 is provided parallel to deflection element 3b. This fin 11 is the first thing to come into contact with the airbag and thus is already responsible for a first change in the airbag's direction. The fin, and likewise deflection element 3b, is provided on its surface with a gliding layer which slides off the airbag as it deploys.

Figure 2:
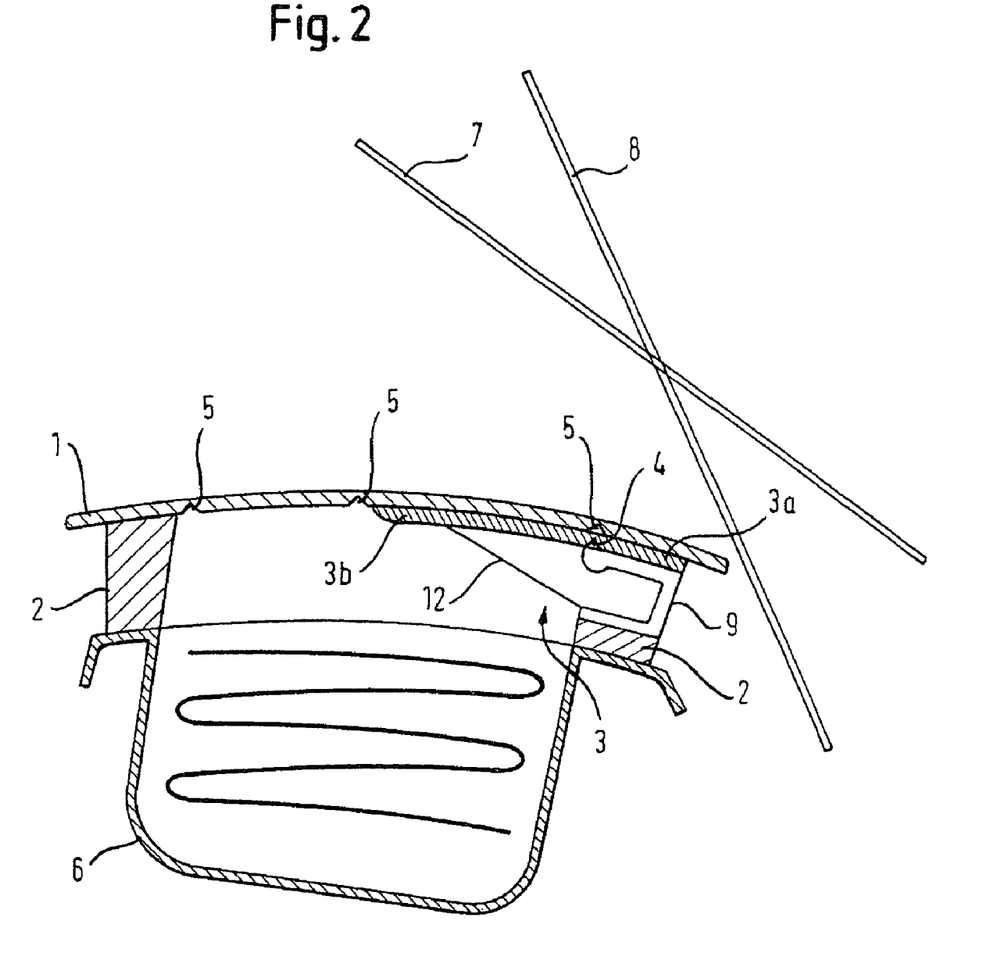
FIG. 2 is a schematic sectional view of a second embodiment of the invention.

FIG. 2 shows a second embodiment of the directional device according to the invention in which directional device 3 may be executed in one or a plurality of parts. As in the first embodiment of FIG. 1, deflection element 3a is disposed on the underside of inherently stable substrate 1. However, attachment section 3b extends laterally as an extension of deflection element 3a and is joined to a spring element 9 provided in the side of the firing channel, from the bottom part of which spring element a stiffening rib 12 extends to deflection element 3b. Spring element 9 and stiffening rib 12 limit the maximum pivot of deflection element 3b about hinge 4 and thus determine its final position. By appropriate selection of the shape and material of spring element 9 and stiffening rib 12 it is thus possible to adapt the final position to the various rakes of windscreen 7, 8.

Figure 3:
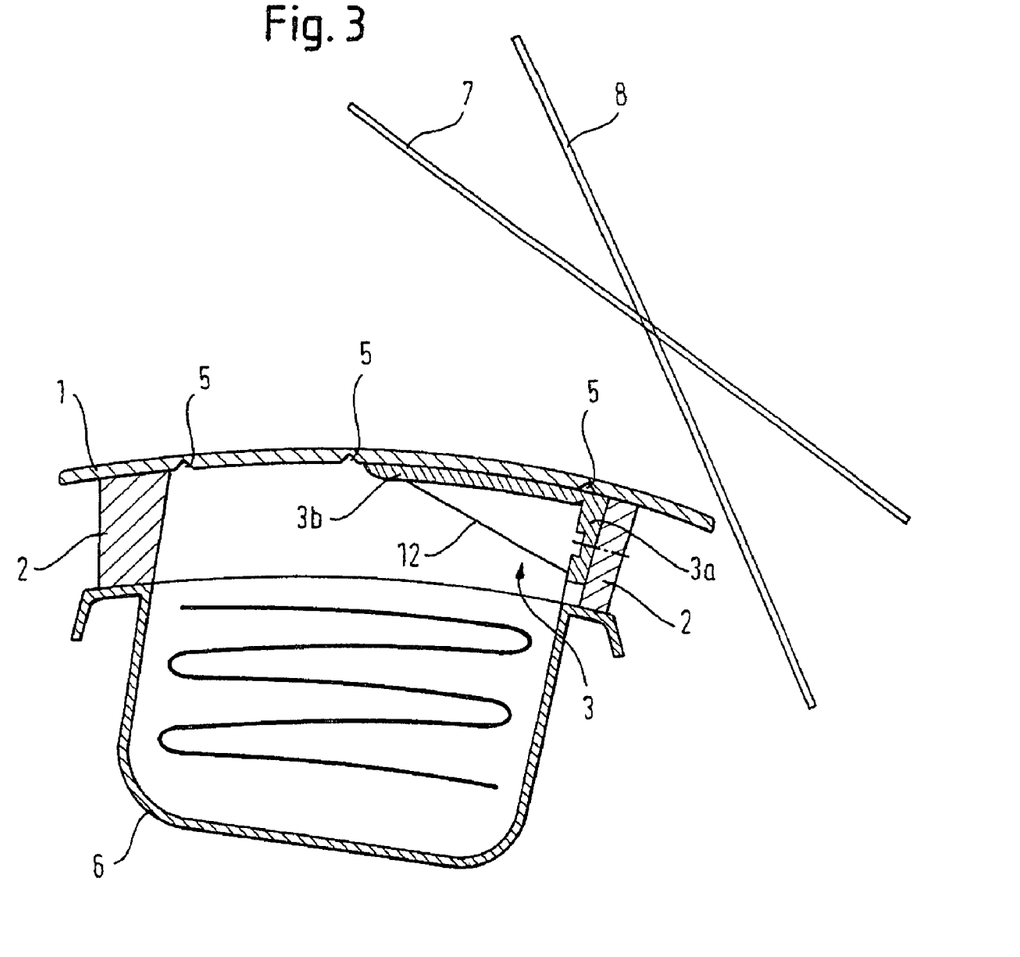
FIG. 3 is a schematic sectional view of a third embodiment of the invention.

A third embodiment of the directional device according to the invention is shown in FIG. 3. As in the first embodiment, directional device 3 is again designed in an L-shape and is disposed and attached as discussed in respect of FIG. 1. Unlike the previous embodiments, no direct hinge is provided in this embodiment. The deflection element's ability to pivot is assured purely by the flexibility of the directional device's material which is softer by comparison with the first two embodiments. However, in order to prevent excessive pivoting, as in the second embodiment a stiffening rib 12 is provided which extends here from the lower part of attachment section 3a to deflection element 3b and determines the final position of the pivotable deflection element. Once again, it is possible to adapt the final position to the rake of windscreen 7, 8 by appropriate selection of the material and shape of the stiffening rib and the directional device respectively.

Figure 4:
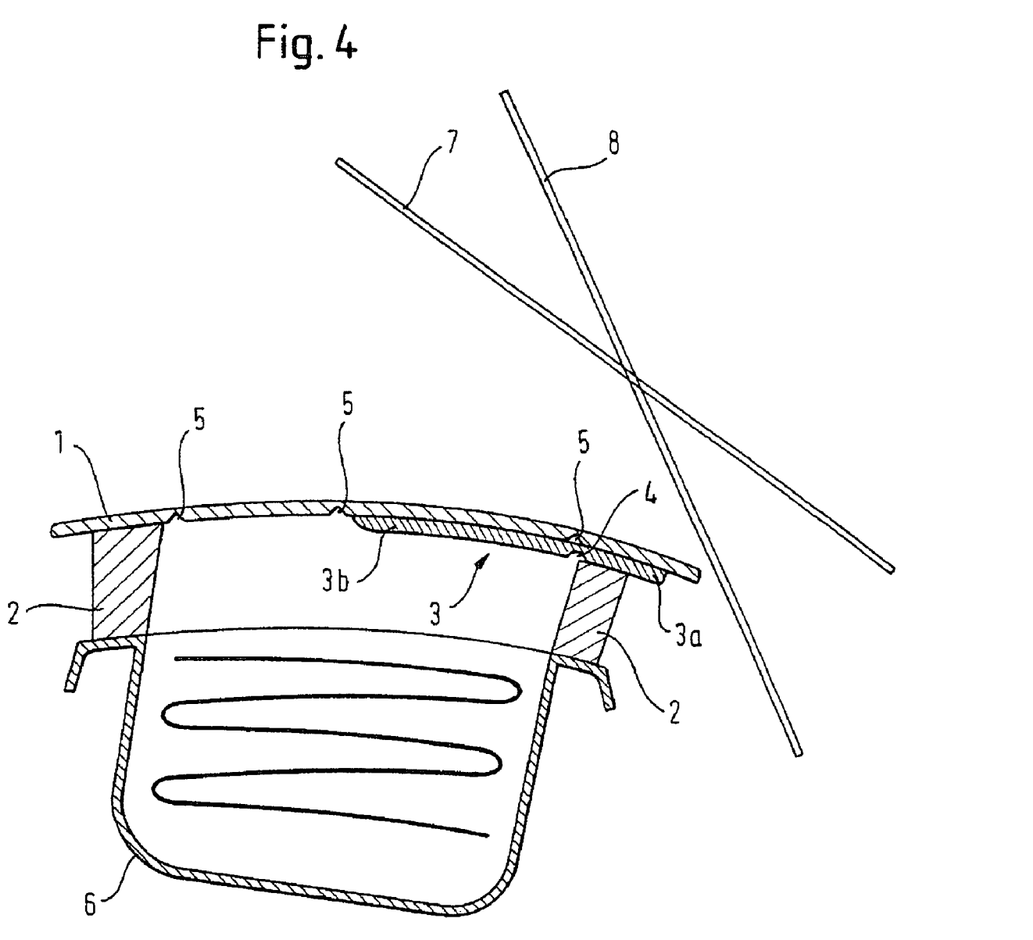
FIG. 4 is a schematic sectional view of a fourth embodiment of the invention.

In the fourth embodiment, the directional device is simpler in design by comparison with the embodiments so far. As in the second embodiment, attachment section 3a extends as an extension of deflection element 3b to which it is joined by way of hinge 4, substantially parallel to inherently stable substrate 1. In this embodiment, attachment section 3a is fixed directly to the side wall of firing channel 2, for example by a threaded connection (here perpendicular to the inherently stable substrate). In the present case, the final position is determined purely by the material properties of the directional device and the type of hinge 4 provided therein and is adapted to the rake of windscreen 7, 8 by appropriate selection of the material.

Figure 5:
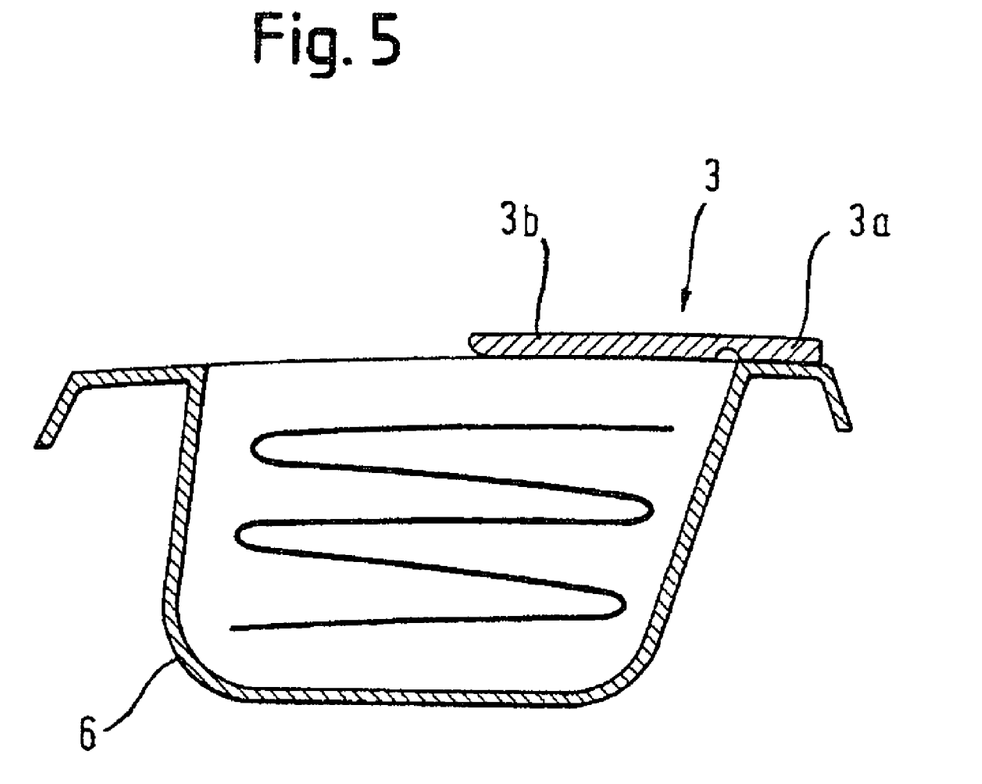
FIG. 5 is a schematic sectional view of a fifth embodiment of the invention.

FIG. 5 illustrates a fifth embodiment of the directional device of the invention. This is similar to the embodiment of FIG. 4 with the difference that in this case directional device 3 is fixed with its attachment section 3a directly to airbag module 6. On actuation of the airbag, deflection of said airbag thus takes place immediately on exiting from the airbag module. The folded airbag may in this case be accommodated somewhat lower in the module such that no separate firing channel is required.

Figure 6:
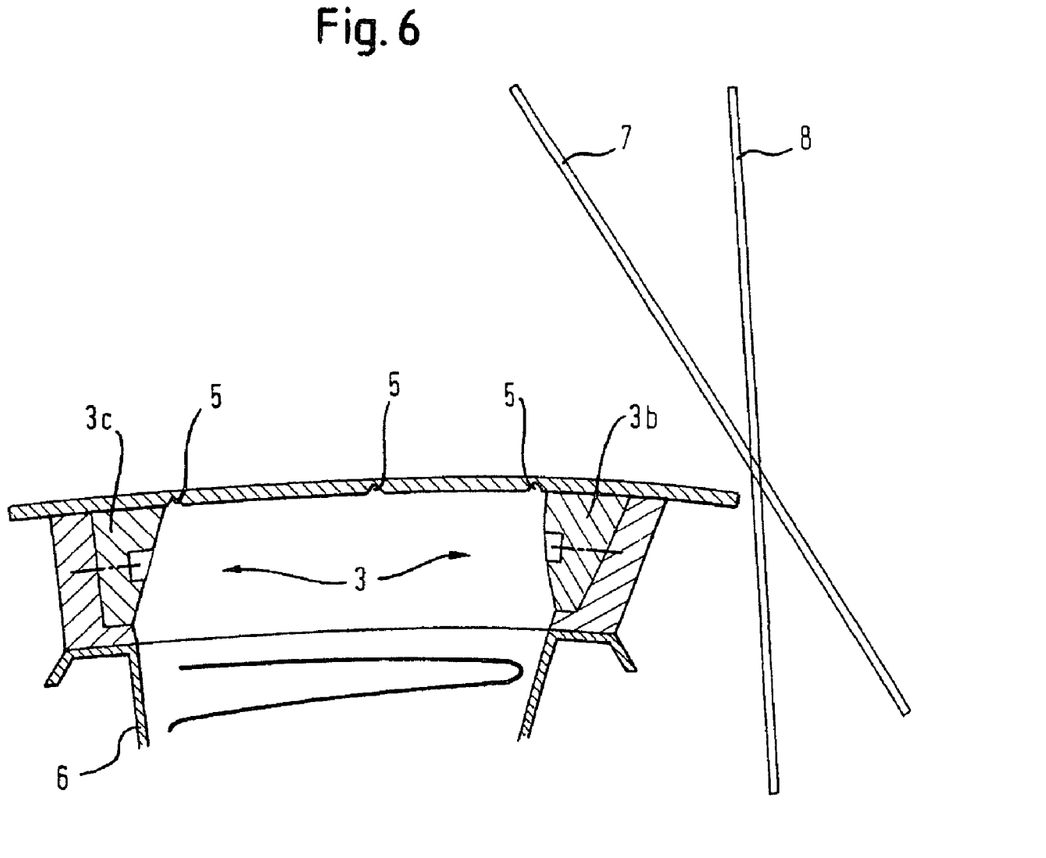
FIG. 6 is a schematic sectional view of a sixth embodiment of the invention.

FIG. 6 represents a sixth embodiment of the invention in which directional device 3 comprises two deflection elements 3b and 3c fixed to the front and rear side of firing channel 2, by a threaded connection for example. These deflection elements define a tapering passage for the expanding airbag wherein the slope of the inward facing walls of deflection elements 3b and 3c determines the airbag's deflection. This particularly simple and cost-effective design is particularly advantageous in the case of only slightly raked windscreens such as those of light commercial vans.

Figure 7:
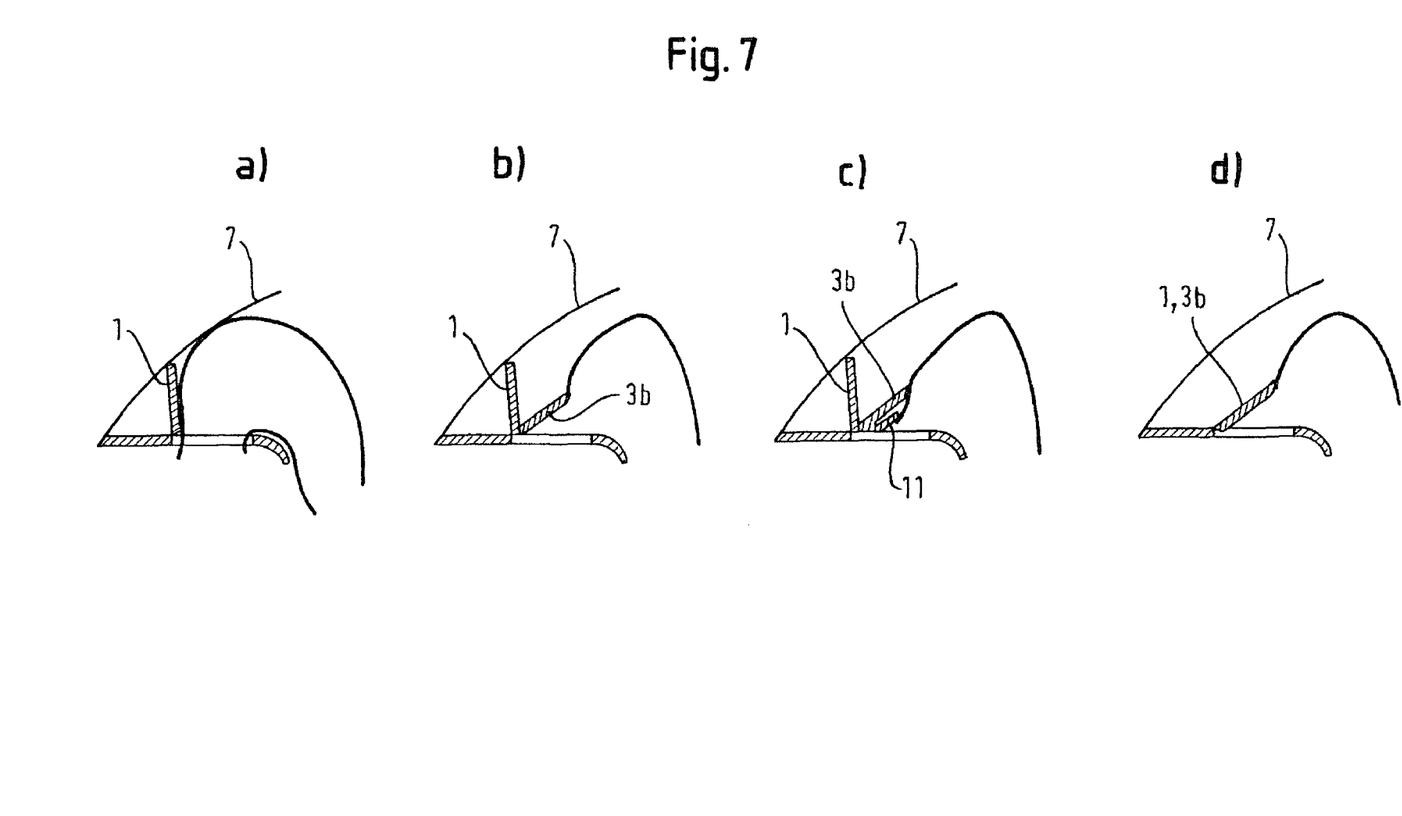
FIG. 7 is schematic representations of the airbag's deployment without (a) and with (b-d) the directional device according to the invention.

FIG. 7 finally shows a comparison of airbag deployment in a conventional system (FIG. 7a) and in systems with directional devices of the invention (FIGS. 7b, c, d). It is clearly visible in FIG. 7a how the airbag lid of the instrument panel opens upwards and hits windscreen 7, whilst the airbag on expanding additionally presses against windscreen 7. In FIG. 7b, although the cover lid also hits windscreen 7 on opening up, nevertheless deployment of the airbag is deflected thanks to deflection element 3b such that the airbag does not destroy windscreen 7 since it does not exert any pressure on it. In FIG. 7c, deflection is reinforced even more by fin 11 and the risk of damaging windscreen 7 is reduced still further. Finally, in FIG. 7d, deflection element 3b is integrated into inherently stable substrate 1 such that now this also no longer hits windscreen 7.

The invention claimed is:

1. A directional device for the deployment of an airbag, the directional device comprising a flexible deflection element integrally formed with an attachment section, wherein the attachment section is adapted to be directly fixed to an instrument panel substrate, to an airbag firing channel formed beneath the instrument panel substrate, or to an airbag module containing a folded airbag, the deflection element directing airbag deployment, said deflection element on actuation of the airbag, exerting a targeted pressure upon the airbag and influencing a direction of deployment during an entire airbag deployment phase, wherein the flexible deflection element and the airbag do not contact a windscreen during the entire airbag deployment phase, and wherein the deflection element remains integral with the attachment section during the entire airbag deployment phase.

2. Directional device according to claim 1 wherein the deflection element is pivotable about a rigid hinge.

3. Directional device according to claim 2 wherein the deflection element is pivotable on actuation of the airbag into no more than one position in which the deflection element is essentially parallel to the windscreen.

4. Directional device according to claim 1, wherein the directional device has an essentially L-shaped cross-section, a long section of the L-shaped cross section forms the deflection element and a short section of the L-shaped cross section is an attachment section.

5. Directional device according to claim 1 wherein a fin projects out of the attachment section of said directional device in a direction that is substantially parallel to the deflection element.

6. Directional device according to claim 1, wherein a directing function of the deflection element is predetermined by a degree of flexibility of the directional device.

7. Directional device according to claim 1, wherein the deflection element has a stiffening rib.

8. Directional device according to claim 1, wherein said directional device has an attachment that can be converted from detachable to non-detachable.

9. Directional device according to claim 1, wherein said directional device includes a gliding layer.

10. Directional device according to claim 1, wherein the deflection element exerts a targeted pressure away from the windscreen.

11. Directional device according to claim 1, wherein said directional device is integrated into an instrument panel substrate, to an airbag firing channel formed beneath the instrument panel substrate, or to an airbag module containing a folded airbag.

12. Directional device according to claim 1, wherein said directional device further comprises at least one component, the at least one component comprising a material selected from the group consisting of thermosetting materials and thermoplastics.

13. Directional device according to claim 12, wherein the material further comprises at least one filling material.

14. Directional device according to claim 13, wherein the at least one filling material is selected from the group consisting of fiberglass, knitted fabric inserts, non-woven system inserts, oscillatable metal inserts, or glass mat inserts.

* * * * *